Patented Mar. 20, 1951

2,545,516

UNITED STATES PATENT OFFICE 2,545,516

DIOLEFIN-NITRILE COPOLYMER PLASTICIZED WITH HYDROCARBON POLYMER

Albert M. Gessler, Cranford, N. J., assignor to Standard Oil Development Company, a corporation of Delaware No Drawing. Application December 31, 1946, Serial No. 719,637

4 Claims. (Cl. 260—23.7)

This invention relates to synthetic rubber compositions and particularly to improved, plasticized, diolefin-acrylonitrile copolymer compositions and a method of preparing the same.

Synthetic rubber material prepared by the copolymerization of a conjugated diolefin such as butadiene-1,3 and a nitrile such as acrylonitrile in aqueous emulsion have achieved considerable commercial importance particularly in view of their oil resistant properties. The superiority in oil resistance of these copolymers over natural rubber has permitted them to compete with and even displace natural rubber despite the fact that the cost of these copolymers has been several times that of natural rubber.

A major difficulty encountered with all synthetic rubbers has been the fact that they are in general relatively hard, dry and non-tacky materials and unlike natural rubber, they are incapable of being masticated to a soft, plastic condition which is not only desirable but necessary for proper compounding and processing into the desired articles.

In order to overcome this difficulty, it has been necessary to add softeners or plasticizers to these synthetic rubbery materials thereby improving their compounding and processing characteristics. The selection of suitable softeners particularly for diolefin-nitrile type synthetic rubbers has presented numerous serious difficulties since their properties are so radically different from natural rubber that many materials which are compatible with or exert a substantial plasticizing effect upon natural rubber or other rubbery hydrocarbons such as butadiene-styrene copolymers are incompatible with or do not effect any improvement in the softness or plasticity of diolefin-nitrile type synthetic rubbers.

In order to plasticize diolefin-nitrile type synthetic rubbers, the art has in general sought out those materials which are compatible with rubbery diolefin-nitrile copolymers. Materials which have been suggested for this purpose have included certain alkyl substituted phenols, monoketones containing from 6 to 10 carbon atoms per molecule, diesters of polyalkylene glycols with aliphatic monocarboxylic acids containing from 3 to 8 carbon atoms per molecule, esters of aromatic monocarboxylic acids with alcohols of less than 10 carbon atoms, monohydric alcohol esters of 6 to 10 carbon atoms, tricarboxylic acids, benzyl alcohol and alkyl ethers thereof. The plasticizers most commonly used have been dialkyl phthalates such as dibutyl phthalate and phosphoric acid esters such as tricresyl phosphate.

I have now discovered that plastic, elastic aliphatic hydrocarbon compounds of a rather narrow molecular weight range are highly effective as softeners or plasticizers for synthetic rubber-like diolefin-nitrile copolymers. This is most surprising since aliphatic hydrocarbons do not exert a solvating action upon these copolymers and are incompatible therewith. The aliphatic hydrocarbons which I use as softeners for diolefin-nitrile copolymers are plastic, elastic compounds having a molecular weight (Staudinger viscosity method) of 8,000–20,000, preferably of 12,000–15,000 which are prepared by polymerizing isobutylene or isoamylene and the like, at temperatures below 0° C. in the presence of a Friedel-Crafts catalyst. Polyisobutylene of the desired molecular weight may be readily prepared by controlling the temperature at which polymerization occurs and/or by controlling the purity of the feed stock. It is known that the lower the temperature of polymerization and the higher the purity of the isobutylene, the higher the molecular weight of the polymer formed. A particularly preferred material is a polyisobutylene prepared with external refrigeration and having a weighted average molecular weight of 12,000 (Staudinger) containing substantially no polymer of less than 8,000 molecular weight or of greater than 17,000 molecular weight (Staudinger). Instead of polyisobutylene, etc. we may also use polybutadiene, polyisoprene or copolymers of an isoolefin such as isobutylene with a diolefin such as butadiene, isoprene or the like prepared at low temperatures in the presence of dissolved Friedel-Crafts catalysts as described in U. S. Patent No. 2,356,128. If the polymers have a higher molecular weight than the maximum indicated above, they may be readily broken down into products of the desired molecular weight by mastication in a Banbury mixer or on a hot mill, preferably with a peptizing agent such as xylyl mercaptan. The amount of degradation is controlled by the amount of peptizing agent, the temperature and the length of the masticating treatment. These materials are substantially free of any solvating action upon the diolefin-nitrile copolymers. The plasticizing action of these hydrocarbon polymer materials may be augmented, if desired, by adding certain complementary plasticizers which also are substantially free of solvating action on these diolefin-nitrile copolymers. Materials which may be so used include diethylene glycol phthalate and linseed or other drying oil polymer-gel.

The synthetic rubbery materials which are plasticized by the hydrocarbon polymeric materials in accordance with the present invention are the emulsion copolymers of a major proportion of a conjugated diolefin of from 4 to 6 carbon atoms per molecule, preferably butadiene-1,3 or isoprene and a minor proportion of an acrylonitrile, preferably acrylonitrile per se, methacrylonitrile, chloroacrylonitrile and the like. While the diolefin must constitute the preponderant amount of the polymerizable material, it is ordinarily preferable to utilize mixtures of from 55 to about 85 parts of diolefin with 45 to about 15 parts of nitrile.

The copolymers of diolefin and nitrile are prepared, as is well known in the art, by emulsifying the monomeric material in from an equal to a twofold quantity of water utilizing a water-soluble soap or other surface active agent as an emulsifier, an oxygen-yielding polymerization catalyst such as hydrogen peroxide, alkali metal or ammonium persulfates and perborates and if desired, polymerization modifiers such as aliphatic mercaptans of at least six carbon atoms per molecule. Polymerization is ordinarily effected at about 20 to about 65° C. and is continued until the monomers are about 75 to 80% converted to polymers.

The polyisobutylene plasticizer may be incorporated in the diolefin-nitrile rubbery copolymers in various ways and amounts. It may, for example, be incorporated in the rubbery copolymer on an ordinary rubber mill, in an extruder, in a Banbury mixer or the like. Instead of adding the plasticizer to the dry rubbery material, the former may be emulsified and the resultant emulsion added to the polymer latex whereupon the mixture is coagulated with brine or the like to give a very uniform mixture of plasticizer in diolefin-nitrile copolymer. In working up diolefin-nitrile type copolymers with formerly used plasticizers it has ordinarily been necessary to subject the polymer to mastication as in a Banbury for several minutes to partially break down the polymer whereupon a portion of the softener is added and the mill again operated for several minutes whereupon the remainder of the softener and the other compounding ingredients are added and a further working effected. A typical mixing cycle was substantially as follows: A charge of butadiene-acrylonitrile copolymer was introduced into a Banbury and masticated for 3 minutes when the Banbury was stopped. 25% of the softener (dibutyl phthalate) all of the filler and zinc oxide were added and the Banbury was operated for an additional 4½ minutes when the physical incorporation of these ingredients was complete. The Banbury was again stopped and the remaining 75% of plasticizer was added and the Banbury was operated for four additional minutes whereupon the mix was complete. With the polyisobutylene of the present invention it is possible to eliminate the preliminary mastication as well as the stepwise addition of plasticizer. Accordingly all the ingredients, copolymer, polyisobutylene, filler, zinc oxide and the like may be introduced into the Banbury at one time and the mix may be completed by about four minutes' operation of the Banbury. This, of course, represents a substantial saving in time as well as in power for preparing the mix.

The amount of hydrocarbon polymer added is ordinarily between 3 and about 40, preferably 15 to 25 parts per 100 parts of pure gum diolefin-nitrile copolymer. When a complementary plasticizer is used it is ordinarily used in lesser amounts than the hydrocarbon polymer, preferably in amounts of up to about 50% of the amount of hydrocarbon polymer. Polyisobutylene having an average molecular weight of 12,000 is useful as a tackifier in diolefin-nitrile type rubbers. In concentrations of 30% or more it affords tack to mixes containing as much as 50% of reinforcing filler. This is an important and highly desirable property because of the fact that although various other materials have the property of imparting tack to diolefin-nitrile copolymers such tackiness disappears when normal amounts, i. e. 50 parts per 100 parts of polymer, of reinforcing fillers are added to the composition.

In addition to its effect upon the ease of working of polymer compositions, the plasticity of the polymer composition has an important bearing upon the rate at which it can be extruded, i. e. the length of product extruded per unit of time, and the dimensional stability of the extruded product. The latter is a property of great importance to the practical rubber man since it is obviously desirable and necessary that the compound be readily fabricated dimensionally within the limits of his specifications. The question of shape and final dimension of the extruded products is dependent wholly on the elastic-plastic properties of the polymer system being handled. The distortion of an extruded item as it issues from the die of the extruder is dependent on its tendency to recover from the deformation induced, i. e. on the development of the reversible, high-elastic component of its deformation. This component attains full development slowly, particularly if the stock is allowed to cool. In many instances where the extruded item is passed directly into a cold water quench trough, the development of the high elastic component is arrested sharply and the rubber remains racked until it is again heated during the early stages of vulcanization and the recovery can continue to completion. In order to allow for the full development of this high-elastic component of deformation, i. e. for complete lateral swell and longitudinal shrinkage, all the tubes formed in the experiments described below were given a 10 minute heat treatment.

The extrusion experiments described below were carried out with the use of a #½ Royle extruder. The machine was set in such a way that the worm turned 80 revolutions per minute and steam was supplied to the head and barrel so that both were maintained at 220° F. A threaded die with an inside forming diameter of 0.4 inch was fastened to the head of the extruder over a core bridge fixed with a core whose outside forming diameter was 0.3 inch. The extruded item, therefore, was a tube having a theoretical outside diameter of 0.4 inch and a theoretical wall thickness of 0.05 inch.

For the test work, stock sheeted from a mill and cut in thin strips was fed into the extruder. The initially formed tube collected at the head of the machine was fed back to the worm for a second pass to insure equilibrium thermal conditions throughout. On the third pass through the tuber, sections of the tube were taken every 30 seconds until two nearly perfect checks were obtained. From the extruder the two tube sections were taken directly to an air oven maintained at 220° F. and allowed to rest for ten minutes on a liberally talced base. After the heat period the tubes were cooled for five minutes at room temperature and their weight and length measured. From the specific gravity of the stock and the measurements of weight and length taken, the volume in cubic centimeters per inch of tube was calculated. This expression of volume shows in precise, quantitative terms the swell of the various polymer-plasticizer systems tested.

The following examples are illustrative of the present invention.

EXAMPLE 1

An emulsion copolymer of 74% butadiene and 26% acrylonitrile was subjected to extrusion in the pure gum state as described above. The same polymer was then masticated or broken down by passing it six times through a cool (80-90° F.) mill set at 0.007 inch. Various amounts of a solvent type plasticizer were then added to the masticated polymer and the respective samples extruded. Equal amounts of polyisobutylene of an average molecular weight of 12,000 (Staudinger) were added to the same original polymer (unmasticated) and the resultant compositions were extruded as described above.

In order to ascertain the effect of reinforcing filler upon the results obtained, the copolymer-dibutyl phthalate and copolymer-polyisobutylene systems were recompounded to contain 50 parts of medium processing channel black and 5 parts of zinc oxide based upon 100 parts of copolymer. The data from all these extrusion tests are summarized in Table I.

It may be readily seen from the above data that distortion of the formed tube becomes greater as the concentration of dibutyl phthalate is increased. Apparently it reaches a limiting value around 30%, but the net effect of its inclusion in the system is to cancel out a major portion of the desirable effect produced by polymer breakdown. In the case of polyisobutylene blends, however, the swell of the extruded tube decreases sharply with increasing polyisobutylene concentrations. The extrusion rate data show that the differences in distortion between the two polymer plasticizer systems is not attributable to differences in extrusion rates.

EXAMPLE 2

In order to determine the effect of additional plasticizers upon a pure gum butadiene-acrylonitrile-polyisobutylene system, a sample containing ten parts of 12,000 average molecular weight polyisobutylene per 100 parts of copolymer was further plasticized by the addition of a solvent type plasticizer, dibutyl phthalate, and a non-solvent type of plasticizer, diethylene glycol phthlate, and the results obtained are summarized in Table II.

*Table II*

VOLUME CC./IN. OF BUTADIENE-ACRYLONITRILE-POLYISOBUTYLENE SYSTEM WITH ADDITIONAL PLASTICIZERS

|  | Dibutyl Phthalate | Diethylene-Glycol Phthalate |
|---|---|---|
| Copolymer-Polyisobutylene System | 2.03 | 2.03 |
| +5% of Additional Plasticizer | 1.96 | 1.73 |
| +10% of Additional Plasticizer | 2.00 | 1.64 |
| +20% of Additional Plasticizer | 2.15 | 1.53 |
| +30% of Additional Plasticizer | 2.27 | 1.46 |

This data shows that up to 10% of an uncomplementary plasticizer may be added too without affecting the swell while a complementary plasticizer added in amounts of up to 30 parts effects a marked improvement in the swell of the extruded tube.

EXAMPLE 3

In order to determine the efficacy of polyiso-

*Table I*

|  | Pure Gum System | | System with Reinforcing Filler | |
|---|---|---|---|---|
|  | Vol., cc./In. | Ext. Rate, In./Min. | Vol., cc./In. | Ext. Rate, In./Min. |
| Original Polymer | 3.45 | 32 |  |  |
| Masticated Polymer | 2.60 | 40 | 2.03 | 80 |
| Masticated Polymer+3% Dibutyl Phthalate | 2.59 | 35 | 2.10 |  |
| Masticated Polymer+6% Dibutyl Phthalate | 2.61 | 36 | 2.12 | 71 |
| Masticated Polymer+10% Dibutyl Phthalate | 2.68 | 35 | 2.18 | 68 |
| Masticated Polymer+20% Dibutyl Phthalate | 3.00 | 41 | 2.33 | 64 |
| Masticated Polymer+30% Dibutyl Phthalate | 3.16 | 39 | 2.26 | 61 |
| Masticated Polymer+40% Dibutyl Phthalate | 3.10 | 43 | 2.14 | 60 |
| Original Polymer+3% Polyisobutylene | 2.41 | 50 | 2.05 | 67 |
| Original Polymer+6% Polyisobutylene | 2.16 |  | 1.91 | 68 |
| Original Polymer+10% Polyisobutylene | 2.03 | 70 | 1.76 | 60 |
| Original Polymer+20% Polyisobutylene | 1.77 | 60 | 1.58 | 56 |
| Original Polymer+30% Polyisobutylene | 1.68 | 63 | 1.52 | 58 |
| Original Polymer+40% Polyisobutylene | 1.51 | 78 | 1.42 | 67 | butylene as a plasticizer in copolymers of butadiene and acrylonitrile having different amounts of combined nitrile than the copolymer of Example 1, three sets of runs were made using copolymers of butadiene and acrylonitrile prepared from mixtures containing 18, 35 and 45% of acrylonitrile in the feed. In each case the copolymer was masticated prior to the addition of the dibutyl phthalate while the polyisobutylene was added without prior mastication or breakdown of the copolymer. The results obtained upon extrusion and testing as described above are summarized in Table III.

*Table III*

VOLUME CC./IN. OF BUTADIENE-ACRYLONITRILE COPOLYMERS OF VARYING NITRILE CONTENT WITH DIFFERENT PLASTICIZERS

| Plasticizer | Dibutyl Phthalate | Polyisobutylene (12,000 Mol. Wt.) |
|---|---|---|
| 18% Combined Nitrile Copolymer+0% Plasticizer | 2.70 | 2.57 |
| 18% Combined Nitrile Copolymer+10% Plasticizer | 2.96 | 2.34 |
| 18% Combined Nitrile Copolymer+20% Plasticizer | 3.11 | 2.10 |
| 18% Combined Nitrile Copolymer+30% Plasticizer | 3.28 | 2.05 |
| 18% Combined Nitrile Copolymer+40% Plasticizer | 3.33 | 1.98 |
| 35% Combined Nitrile Copolymer+0% Plasticizer | 1.88 | 2.10 |
| 35% Combined Nitrile Copolymer+10% Plasticizer | 1.97 | 1.80 |
| 35% Combined Nitrile Copolymer+20% Plasticizer | 2.08 | 1.60 |
| 35% Combined Nitrile Copolymer+30% Plasticizer | 2.25 | 1.40 |
| 35% Combined Nitrile Copolymer+40% Plasticizer | 2.44 | 1.17 |
| 45% Combined Nitrile Copolymer+0% Plasticizer | 1.99 | 2.10 |
| 45% Combined Nitrile Copolymer+10% Plasticizer | 2.28 | 1.90 |
| 45% Combined Nitrile Copolymer+20% Plasticizer | 2.56 | 1.92 |
| 45% Combined Nitrile Copolymer+30% Plasticizer | 2.58 | 1.82 |
| 45% Combined Nitrile Copolymer+40% Plasticizer | 2.63 | 1.77 |

It may be readily seen from this data that polyisobutylene of 12,000 average molecular weight reduces swell in butadiene-acrylonitrile copolymers of 18, 35 and 45% combined nitrile content to substantially the same extent as it does in copolymers of 26% combined nitrile content while dibutyl phthalate increases the swell in each of these copolymers.

EXAMPLE 4

Extrusion experiments were run with butadiene-acrylonitrile copolymers of 26% combined nitrile using a polyisobutylene of about 5,000 molecular weight and also polyisobutylene of about 40,000 and 60,000 molecular weight as plasticizers. It was found, however, that these materials are unsatisfactory because the lower molecular materials showed a pronounced tendency to bleed from the composition while the higher molecular materials did not exert a substantial plasticizing effect upon the butadiene-acrylonitrile copolymer, giving highly swollen porous tubes, which tended to crumble when worked in the hands.

Several experiments were conducted in order to ascertain the open mill behavior of butadiene-acrylonitrile copolymer-polyisobutylene systems and to compare the same with systems containing dibutyl phthalate as plasticizer.

EXAMPLE 5

A series of conventional, tread type compounds were prepared according to the following recipe:

| | | |
|---|---|---|
| Polymer (26% combined nitrile) | grams | 200.0 |
| Plasticizer | | Variable |
| Zinc oxide | grams | 10.0 |
| M. P. C. black (Kosmobile 66) | do | 100.0 |
| Benzothiazyl disulfide | do | 2.0 |
| Sulfur | do | 3.0 |

Mixing of the several ingredients was effected on a laboratory 6″ x 12″ open mill operating at a 1:1.4 speed ratio. The starting temperature for each batch of stock was set carefully at 90–95° F. and full cooling water was kept on throughout the mixing period. No attempt was made to maintain a constant mill setting over the entire work in the program, but instead the mill was set to allow for an active rolling bank wherever possible. In many instances this was not possible since excessive bagging of the stock could be eliminated only by working with a tight mill setting.

It is noted that premastication was eliminated completely in the case of all compounds containing polyisobutylene since it has the property of knitting together butadiene - acrylonitrile copolymers which lace badly or are only partially banded on the mill. Polyisobutylene and the copolymer were added simultaneously to the mill, the former usually just rolled in the latter and the band which was able to be formed immediately was cut from side to side for blending. Dibutyl phthalate, on the other hand, had to be added to matrix polymer after it had banded since the addition of only a small portion of the former causes severe lacing and breaking apart of the banded material. This tendency to cause lacing and breaking of the band continued even after large amounts of this plasticizer had already been incorporated. The data obtained in these experiments is summarized in Table IV, below. It may be readily seen therefrom that a substantial saving in the time required to prepare a batch was realized when polyisobutylene was used as the plasticizer.

Another series of runs were carried out with a typical molded goods recipe, i. e. using 150 parts of Gastex, a semi-reinforcing furnace black instead of 100 parts of M. P. C. black in the above recipe. Using 10, 20, 30 and 40% (based upon the butadiene-acrylonitrile copolymer in the recipe) of polyisobutylene of 12,000 average molecular weight and the same amounts of dibutyl phthalate, total mixing times with the former were 5 minutes in each case while with the latter, mixing times were 13½, 14½, 18 and 20¾ minutes with 10, 20, 30 and 40% of dibutyl phthalate respectively.

In order to determine whether polyisobutylene would offer the same advantages in open mill operation with other difficultly processable copolymers, the above recipes were recompounded using an equal amount of a very high Mooney (175+ Mooney viscosity) copolymer of butadiene and acrylonitrile containing 35% of combined nitrile. In the corresponding molded goods as well as tread type recipes, the total mixing time varied between 5 and 6 minutes showing the efficacy of polyisobutylene as a plasticizer in recipes contain-

Table IV
MILL MIXING OF CONVENTIONAL TREAD TYPE COMPOUNDS

| | Plasticizer, Grams | | Time to Break Butadiene-Acrylonitrile Copolymer | Time to Add Plasticizer | Time to Add Other Ingredients | Total Mixing Time |
|---|---|---|---|---|---|---|
| | Polyiso-butylene | Dibutyl Phthalate | | | | |
| | | | Minutes | Minutes | Minutes | Minutes |
| Basic Recipe | 0.0 | 0.0 | 5 | 0 | 5 | 10 |
| Sample A₁ | 6 | | 0 | 2½ | 4½ | 7 |
| Sample A₂ | | 6 | 5 | 1¾ | 4½ | 11¼ |
| Sample A₃ | 12 | | 0 | 2 | 3½ | 5½ |
| Sample A₄ | | 12 | 5 | 3½ | 3½ | 12 |
| Sample A₅ | 20 | | 0 | 2 | 3½ | 5½ |
| Sample A₆ | | 20 | 5 | 4 | 3¾ | 12¾ |
| Sample A₇ | 40 | | 0 | 2 | 4 | 6 |
| Sample A₈ | | 40 | 5 | 6¼ | 2¾ | 14 |
| Sample A₉ | 60 | | 0 | 2 | 3½ | 5½ |
| Sample A₁₀ | | 60 | 5 | 9½ | 2½ | 17 |
| Sample A₁₁ | 80 | | 0 | 2 | 4 | 6 |
| Sample A₁₂ | | 80 | 5 | 12½ | 2¼ | 19¾ |

Sample—Showed severe bagging throughout mix; bank never active, compound dry.
Samples A₁ and A₃—Bagging not severe; lacing on every black addition; bank never active; compound dry.
Sample A₂—Severe bagging after 75% of black added; bank never active; compound dry.
Sample A₄—Bagging after black addition but not severe; bank not active after black addition; compound dry.
Samples A₅ and A₇—Bagging not severe; lacing more severe on black addition; bank never active.
Sample A₆—No bagging; bank not active after black addition; compound dry.
Samples A₉ and A₁₁—No lacing or bagging; bank active.
Samples A₈, A₁₀ and A₁₂—No bagging; active bank throughout.

ing high nitrile, high Mooney viscosity copolymers.

EXAMPLE 6

In order to determine whether the results obtained on a laboratory mill could also be obtained on a regular factory mill, several batches were prepared on a 60" factory mill operating at a 1:1.4 speed ratio with full cooling water. Starting temperatures were 100–110° F. As in the case of laboratory milling, the addition of dibutyl phthalate was very difficult because of the lacing and breaking apart of the band.

It has long been known that a tight mill setting is necessary to band a conventional butadiene-acrylonitrile copolymer. In view of this fact the mill was set as tightly as possible at the start of each mixing cycle and the polymer or polymer blend thrust on the rolls was banded. After the time to form the band was noted, the mill was opened slowly to the point where the band began to lace or break apart. In this way it was possible to obtain the widest mill setting consistent with the maintenance of the band. It is noted that while the low Mooney polymer (sample 2 in Table V) formed a band rapidly, the mill could not be appreciably opened without breaking the band. In all cases wherein dibutyl phthalate was added, tight mill settings were necessary and consequently a large portion of the polymer charge rode idly on the nip of the mill so that no rolling bank could be formed. As the concentration of polyisobutylene in the composition was increased, wider mill settings were possible and active rolling banks were obtained. In the case of the 20% blend, the band never broke and the mill was opened as wide as possible consistent with the maintenance of the rolling bank. If a larger charge had been used, an even wider mill setting would have been possible without detrimental effect on the band. The results obtained in these experiments are summarized in Table V.

Table V

| | 1 | 2 | 3 | 4 | 5 | 6 |
|---|---|---|---|---|---|---|
| Butadiene-Acrylonitrile (26% combined nitrile) | 40.0 | | | | | |
| Butadiene-Acrylonitrile (Low Mooney) [1] | | 40.0 | | | | |
| Blend 1 [2] | | | 42.0 | | | |
| Blend 2 | | | | 44.0 | | |
| Blend 3 | | | | | 46.0 | |
| Blend 4 | | | | | | 48.0 |
| Dibutyl Phthalate | 8.0 | 8.0 | 8.0 | | | |
| Zinc Oxide | 2.0 | 2.0 | 2.0 | 2.0 | 2.0 | 2.0 |
| S. R. F. Black (Gastex) | 30.0 | 30.0 | 30.0 | 30.0 | 30.0 | 30.0 |
| Benzothiazyl Disulfide (Altax) | 0.4 | 0.4 | 0.4 | 0.4 | 0.4 | 0.4 |
| Time to band (in minutes) | 13 | 2 | Immediately | | | |
| Mill setting to form band inches | 3/32 | ¼ | 3/16 | 5/16 | ½ | 5/8 |
| Time to add Plasticizer (in minutes) | 16 | 18 | 12 | 0 | 0 | 0 |
| Time to add Black, ZnO, Altax (in minutes) | 32 | 22 | 23 | 28 | 26 | 18 |
| Total Mixing Time (in minutes) | 61 | 42 | 35 | 28 | 26 | 18 |
| Final Mill Roll Temperature °F | 195 | 150 | 180 | 170 | 170 | 150 |
| Final Stock Temperature °F | 250 | 225 | 240 | 240 | 240 | 220 |

[1] The low Mooney viscosity copolymer used is one prepared at 75°F. in a morpholine activated reaction system.
[2] Blends 1–4 are premixed blends of 100 parts of the butadiene-acrylonitrile copolymer of column 1 with 5, 10, 15 and 20 parts respectively of polyisobutylene of 12,000 average molecular weight.

It may be readily seen from the foregoing description that the use of hydrocarbon polymers such as polyisobutylene of a limited molecular weight range not only facilitates the incorporation of compounding ingredients in diolefin-acrylonitrile copolymers but also yields compounds which can be extruded at high rates and high degrees of dimensional accuracy.

The foregoing description contains a limited number of embodiments of the present invention. It will be understood, however, that numerous variations are possible without departing from the scope of the invention as defined in the following claims.

What I claim and desire to secure by Letters Patent is:

1. A composition of matter comprising 100 parts of a rubber-like emulsion copolymer of 55 to 85% of a conjugated diolefin having from 4 to 6 carbon atoms per molecule with 45 to 15% of acrylonitrile and, as a softening agent therefor, 3 to 25 parts of a hydrocarbon polymer having a Staudinger molecular weight between 8,000 and 20,000 and selected from the group consisting of polyisobutylene, polybutadiene, polyisoprene and copolymers of isobutylene with isoprene and 5 to 30 parts of a complementary softener selected from the group consisting of linseed oil polymer gel and diethylene glycol phthalate.

2. A composition as defined in claim 1 wherein the hydrocarbon polymer is polyisobutylene and wherein the complementary plasticizer is linseed oil polymer gel.

3. A composition of matter comprising 100 parts of a rubber-like emulsion copolymer of 55 to 85% of butadiene-1,3 with 45 to 15% of acrylonitrile and, as a softening agent therefor, 3 to 25 parts of polyisobutylene having a Staudinger molecular weight between 12,000 and 15,000 and 5 to 30 parts of diethylene glycol phthalate.

4. A composition of matter comprising 100 parts of a rubber-like emulsion copolymer of 55 to 85% of butadiene-1,3 with 45 to 15% of acrylonitrile and, as a softening agent therefor, 10 parts of polyisbutylene having an average Staudinger molecular weight of 12,000 and 30 parts of diethylene glycol phthalate.

ALBERT M. GESSLER.

REFERENCES CITED

The following references are of record in the file of this patent:

UNITED STATES PATENTS

| Number | Name | Date |
|---|---|---|
| 2,194,958 | Szegvari et al. | Mar. 26, 1940 |
| 2,202,363 | Wiezevich | Apr. 17, 1941 |
| 2,319,959 | Tierney | May 25, 1943 |

FOREIGN PATENTS

| Number | Country | Date |
|---|---|---|
| 705,104 | Germany | Apr 17, 1941 |
| 913,297 | France | May 27, 1946 |

OTHER REFERENCES

Ludwig et al., India Rubber World, Oct. 1944, pages 55 and 56.

"Hycar Synthetic Rubber-Softener Study for Type O. R.," vol. 2, 1941, pages 1-3, 5, 16 and 17; published by Hydrocarbon Chemical and Rubber Company, Akron, Ohio.

Stocklin, pages 51, 57-59, June 1937, Transactions Institution of the Rubber Industry, vol. 15.

Moll, pages 1284, 1287-1291, Nov. 1942, Ind. and Eng. Chem.